United States Patent [19]
Shore et al.

[11] Patent Number: 5,970,554
[45] Date of Patent: Oct. 26, 1999

[54] APPARATUS AND METHOD FOR CONTROLLING THE USE OF CARBON DIOXIDE IN DRY CLEANING CLOTHES

[75] Inventors: Stephen H. Shore, Erie; Larry R. Rosio, Fairview, both of Pa.

[73] Assignee: Snap-Tite Technologies, Inc., Wilmington, Del.

[21] Appl. No.: 09/143,397

[22] Filed: Aug. 28, 1998

Related U.S. Application Data

[60] Provisional application No. 60/058,234, Sep. 9, 1997.

[51] Int. Cl.$^6$ .......................... D06F 43/08; G01F 23/284
[52] U.S. Cl. ................................ 8/158; 68/18 C; 68/18 F
[58] Field of Search ......................... 8/142, 158; 68/18 C, 68/18 F, 18 R; 73/295

[56] References Cited

U.S. PATENT DOCUMENTS

| | | | |
|---|---|---|---|
| 3,905,243 | 9/1975 | Goldfuss | 73/295 |
| 4,423,629 | 1/1984 | Ara et al. | 73/295 |
| 4,592,230 | 6/1986 | Waring et al. | 73/295 |
| 5,167,154 | 12/1992 | Lee | 73/295 |
| 5,201,223 | 4/1993 | McQueen | 73/295 |
| 5,267,455 | 12/1993 | Dewees et al. | 68/18 R X |
| 5,683,977 | 11/1997 | Jureller et al. | 8/142 X |
| 5,822,818 | 10/1998 | Chao et al. | 8/158 |

*Primary Examiner*—Philip R. Coe
*Attorney, Agent, or Firm*—Woodling, Krost & Rust

[57] ABSTRACT

An apparatus and method for controlling the use of carbon dioxide in drying cleaning clothes, garments and other fabrics is disclosed and claimed. The components of the invention include a distillation vessel, a compressor, a warm-up vessel, a cleaning chamber, a condenser, and a carbon dioxide storage tank. A programmable logic controller is utilized to control the apparatus. Several modes of use are disclosed. One mode, the reclaim mode, enables the efficient operation of the apparatus. As the name implies the reclaim mode recovers most of the carbon dioxide gas remaining in the cleaning chamber is removed therefrom. There are three steps of the reclaim mode: in the first steps the compressor pumps the gaseous carbon dioxide in two parallel stages from the cleaning chamber to the condenser where heat is removed therefrom and it is liquified; in the second step the compressor pumps the gaseous carbon dioxide through the warm-up vessel and back to the cleaning chamber thus preventing the formation of solid carbon dioxide (dry ice) on the clothes, garments or fabrics in the cleaning chamber; and, in the third step two stages of compression are utilized to remove as much of the gaseous carbon dioxide as possible from the cleaning chamber and pump it to the condenser. The carbon dioxide used in the apparatus is cleaned, in part, by a distillation vessel. Heated thermocouples are used to detect the level of liquid carbon dioxide in the storage tank and the distillation vessel.

18 Claims, 9 Drawing Sheets

| Valve Number | 62A | | 65 | | 46 | | 25A | | 35 | | 27 | | 11 | | 9 | | 36 | | 29 | | 32 | | 49 | | 22 | | 18 | | 20 | |
|---|---|---|---|---|---|---|---|---|---|---|---|---|---|---|---|---|---|---|---|---|---|---|---|---|---|---|---|---|---|
| Functional Mode | X-Z | Y-Z | X-Z | Y-Z | X-Z | Y-Z | X-Z | Y-Z | O | C | O | C | O | C | O | C | O | C | O | C | O | C | O | C | O | C | O | C | O | C |
| Loading Vessel (Idle Mode) | X | | X | | | | | | | X | | X | | X | | X | | X | | X | | X | | X | | X | | X | | X |
| Evacuate Vessel (Remove Air From Vessel) | X | | X | | | | X | | | X | | X | | X | | X | | | X | | | X | X | | | | | | | X |
| Prefill From Distillation Vessel (Gas) | X | | X | | | | X | | | X | | X | | X | X | | | X | | X | X | | | | | | | | | X |
| Prefill From Storage (Gas) | X | | X | | | | X | | | X | | X | X | | | X | | X | | X | | X | | X | | X | | X | | X |
| Pressurize (Liquid) | X | | | X | | | X | | | X | | X | | X | | X | | X | | X | | X | | X | | X | | X | | X |
| Wash Cycle | X | | X | X% | X% | | X | | | X | | X | | X | | X | | X | | X | | X | | X | | X | | X | | X |
| Drain (Liquid) | | X | | | | | | | | X | | X | | X | | X | | X | | X | | X | | X | | X | | X | | X |
| Reclaim Step 1 | X | | X | | | | X | | | X | | X | | X | | X | | X | | X | | X | | X | | X | | X | | X |
| Reclaim Step 2 | X | | X | | | | X | | | X | | X | | X | X | | | X | | X | | X | | X | | X | X | | | X |
| Reclaim Step 3 | X | | X | | | | X | | | X | | X | | X | X | | | X | | X | | X | | X | | X | X | | | X |
| Vent | X | | X | | | | X | | | X | | X | | X | | X | | X | | X | | X | | X | | X | | | X | |
| Storage Fill | X | | | | | | X | | | X | | X | | X | | X | X | X | X% X% | | | X | X% X% | X% | | | X | | X |
| Distillation (Liquid To Gas) | X | | X | | | | X | | | X | | X | | X | | X | X | X | | X | | X | X | | X% X% | X% X% | X% X% | | X% X% | X% X% |

APPARATUS AND METHOD FOR CONTROLLING THE USE OF CARBON DIOXIDE IN DRY CLEANING CLOTHES

This application claims priority of United States Provisional Application No. 60/058,234, filed Sep. 9, 1997. The present invention is directed toward an apparatus for controlling the use of carbon dioxide in dry cleaning clothes and/or fabrics.

FIELD OF INVENTION

Carbon dioxide is an environmentally safe medium for cleaning clothes, garments and fabrics as it is a naturally occurring gas. Presently, clothes, garments and fabrics are cleaned using solvents such as percholoeythylene which present exposure health risks.

The present invention employs a cleaning chamber, a carbon dioxide condenser, a carbon dioxide storage tank, a compressor, a warm-up vessel, a pump, a distillation vessel, and a programmable logic controller. Piping, air operated valves (AOVs), and manually operated valves (not shown) interconnect the process components of the invention. Instrumentation and wiring (not shown) interconnect to the programmable logic controller. The programmable logic controller controls the AOVs, motor starters, heater power and pumps.

The cleaning chamber is the place where the clothes, garments and fabrics reside during the cleaning process. The cleaning chamber employs nozzles as taught, disclosed and claimed in copending U.S. patent application Ser. No. 09/005,866, filed Jun. 12, 1998.

BACKGROUND OF THE INVENTION

U.S. Pat. No. 5,467,492 to Chao et al. discloses and claims an apparatus and method for DRY CLEANING OF GARMENTS USING LIQUID CARBON DIOXIDE UNDER AGITATION AS CLEANING MEDIUM. The '492 patent does not illustrate a compressor which is used in a reclaim mode.

U.S. Pat. No. 5,456,759 to Stanford, Jr. et al. discloses sonication cleaning using megasonic energy. The '759 patent does not include equipment to reclaim gaseous carbon dioxide left over in the cleaning chamber after the wash cycle. In column 7, lines 12 et seq. it is disclosed that contamination, be it organic or particulate, can be removed through decompression, filtration, or a combination of both.

U.S. Pat. No. 5,683,473 to Jureller, et al. at column 19, lines 60 et seq. also discloses the separation of dirt and spent cleaning agents through decompression. The '473 does not show or claim reclamation of the carbon dioxide U.S. Pat. No. 5,267,455 to Dewees, et al. illustrates and claims a vaporizer 11 in combination with other equipment. No reclamation apparatus is disclosed or claimed in the '455 patent.

None of the related art discloses or claims an apparatus for reclaiming gaseous carbon dioxide from the cleaning chamber, nor does any of the related art disclose the reclaiming apparatus and process in combination with a distilling and purging process for removing contaminants from the liquid or from the carbon dioxide.

SUMMARY OF THE INVENTION

The system operates in eight modes. The first mode is for loading the cleaning chamber with clothes and/or fabrics. After the cleaning chamber is loaded, it is evacuated in an evacuation mode to remove air and/or moisture therefrom. The cleaning chamber is then filled with carbon dioxide gas first from the top of the distillation vessel and then from the storage tank. The filling of the cleaning chamber with carbon dioxide gas is known as the prefill mode. Next, the cleaning chamber is filled with liquid carbon dioxide from the storage tank. This is the pressurization mode.

After the cleaning chamber has been filled with liquid carbon dioxide, the wash mode begins and the clothes/fabrics are agitated by the continuous flow of liquid carbon dioxide alternating between two sets of nozzles. During the wash mode, liquid carbon dioxide is constantly passed through a lint trap, a filter, and through a condenser where it then is recirculated from storage and pumped back to the cleaning chamber. Wash mode time can be controlled by the operator by way of interface to a programmable logic controller.

At the conclusion of the wash mode, the liquid carbon dioxide is drained in the drain mode back to the carbon dioxide storage tank. Before reaching the storage tank, the liquid passes through the pump, the filter, and the carbon dioxide condenser.

The storage tank is controlled between 690 and 775 psig by means of a programmable logic controller which monitors the pressure of the storage tank and compares it to a set point. At these pressures the carbon dioxide is in the temperature range of approximately 10 to 14° C. The signal difference is then acted upon by the programmable logic controller which controls the refrigeration compressor.

Following the drain mode comes the reclaim mode. In the first step of the reclaim mode, the carbon dioxide gas remaining in the cleaning chamber is pumped out by the carbon dioxide compressor to the condenser where it is converted to liquid and then is sent back to the storage tank. In a second step of reclamation, known as the reclaim warm-up step, the carbon dioxide gas is pumped through a warm-up vessel by the compressor and is then recirculated to the cleaning chamber. This prevents the formation of solid carbon dioxide (dry ice) on or in the clothes, garments or fabrics in the cleaning chamber. In a third step of reclamation, known as the final reclaim step, the compressor is used as a two stage compressor. Following the reclaim mode, the cleaning chamber is vented in the vent mode.

There are several maintenance modes. For instance, periodically make up carbon dioxide must be added to the system, the distillation vessel's sludge must be dumped and the filter must be changed. The user of the apparatus supplies a make-up source of liquid carbon dioxide which is usually a pressurized carbon dioxide bottle at 700 to 860 psig at ambient temperatures. The customer supplied carbon dioxide source is interconnected to liquid feed pump referred to herein as the second feed pump. Alternatively, carbon dioxide may be input to the distillation vessel to make up lost carbon dioxide.

One of the maintenance modes is the distillation mode. Liquid carbon dioxide is continuously boiled off in the distillation mode leaving behind spent cleaning agents, dirt and other contaminants left over from the wash cycle.

It is a further object of the present invention to provide a carbon dioxide cleaning system which includes the reclamation of the carbon dioxide gas from the cleaning chamber to increase the cost efficiency of the carbon dioxide cleaning system.

It is a further object of the present invention to provide a carbon dioxide cleaning system which includes a cleaning chamber, a compressor, a filter, a condenser, a storage tank, a pump, a warm-up vessel, and a programmable logic controller to control the system.

It is a further object of the present invention to provide an apparatus for distilling and cleaning the carbon dioxide used in laundering clothes garments and fabrics.

It is a further object of the present invention to provide a liquid level sensing apparatus for determining the level of liquid in a tank or other vessel comprising a thermocouple, a heater, a protective covering surrounding the thermocouple, such that the protective covering extends within the tank. It has been found that the temperature change when the protective covering is immersed in the fluid is significant and enables liquid level control within the system.

It is a further object of the present invention to provide a process for cleaning carbon dioxide used to clean clothes, garments, and fabrics comprising the steps of: filling a distillation vessel with liquid carbon dioxide from a storage tank until a predetermined high level in the distillation vessel is reached; heating and boiling the liquid carbon dioxide in the distillation vessel to generate gaseous carbon dioxide; removing the gaseous carbon dioxide from the distillation vessel and compressing the gaseous carbon dioxide with the compressor; condensing the gaseous carbon dioxide in the condenser into liquid carbon dioxide; and, returning the liquid carbon dioxide to the storage tank.

It is a further object of the present invention to provide a process for cleaning carbon dioxide which includes a step of heating and boiling the liquid carbon dioxide in the distillation vessel to generate gaseous carbon dioxide resulting in the lowering of the liquid level in the distillation vessel until a predetermined low level in the distillation vessel is reached which initiates the filling of the distillation vessel with liquid from the bottom of the storage tank.

It is a further object of the present invention to provide a process for reclaiming gaseous carbon dioxide from a cleaning chamber employing carbon dioxide to launder clothes, garments or fabrics utilizing a compressor, condenser and storage tank, comprising the steps of: compressing the gaseous carbon dioxide; condensing the gaseous carbon dioxide into liquid carbon dioxide; and, storing the liquid carbon dioxide in a storage tank.

It is a further object of the present invention to provide an apparatus for reclaiming gaseous carbon dioxide from the cleaning chamber comprising a two stage compressor, a warm-up vessel, a condenser and a storage tank.

It is a further object of the present invention to provide an apparatus for providing reclamation of gaseous carbon dioxide from the cleaning chamber in three steps. In the first step the compressor pumps (using two parallel stages) the gaseous carbon dioxide from the cleaning chamber to the condenser where heat is removed therefrom and it is liquified and returned to the storage tank. In the second step the compressor pumps (using two parallel stages) the gaseous carbon dioxide through the warm-up vessel and back to the cleaning chamber thus preventing the formation of solid carbon dioxide (dry ice) on and in the clothes, garments or fabrics within the cleaning chamber. Alternatively, the compressor could pump a portion of the gaseous carbon dioxide to the condenser and back to the storage tank. In the third step the compressor initially pumps the gaseous carbon dioxide using two parallel stages until a certain pressure is reached within the cleaning chamber. Then, the compressor is utilized as a two stage compressor utilizing the stages of compression in series rather than in parallel. Two stages of compression in series are utilized to remove as much of the gaseous carbon dioxide as possible from the cleaning chamber and pump it to the condenser.

It is a further object of the present invention to provide a closed loop apparatus for controlling the use of carbon dioxide in cleaning clothes, garments or fabrics which includes an on-board storage tank, carbon dioxide pump, cleaning chamber, carbon dioxide warm-up vessel, compressor, condenser, programmable logic controller, and interconnecting lines and air operated valves. Air operated valves are employed throughout the apparatus for control thereof. Electric power, air pressure, and cooling water are supplied by the user to operate the components and air operated valves of the apparatus.

It is an object of the present invention to provide a cleaning chamber which includes an alternating three-way valve controlling the flow of liquid carbon dioxide admitted to nozzles residing within the cleaning chamber.

The objects of the invention will be best understood when taken in conjunction with the following Brief Description Of The Drawings.

BRIEF DESCRIPTION OF THE DRAWINGS

FIG. 3 illustrates, among other things, a pressure transducer monitoring the pressure in the storage tank, a three-way valve interposed between the storage tank, pump and cleaning chamber, and a three-way valve controlling the flow into nozzles leading into the cleaning chamber. Additionally, FIG. 3A also illustrates three way 25A and 65 interconnecting the pump, cleaning chamber and the filter train. FIG. 3A also illustrates that the PLC controls the apparatus.

FIG. 8A and FIG. 3A should be considered together. FIG. 8 should not be considered together with any figure other than FIG. 3A.

DESCRIPTION OF THE INVENTION

Figure 1:
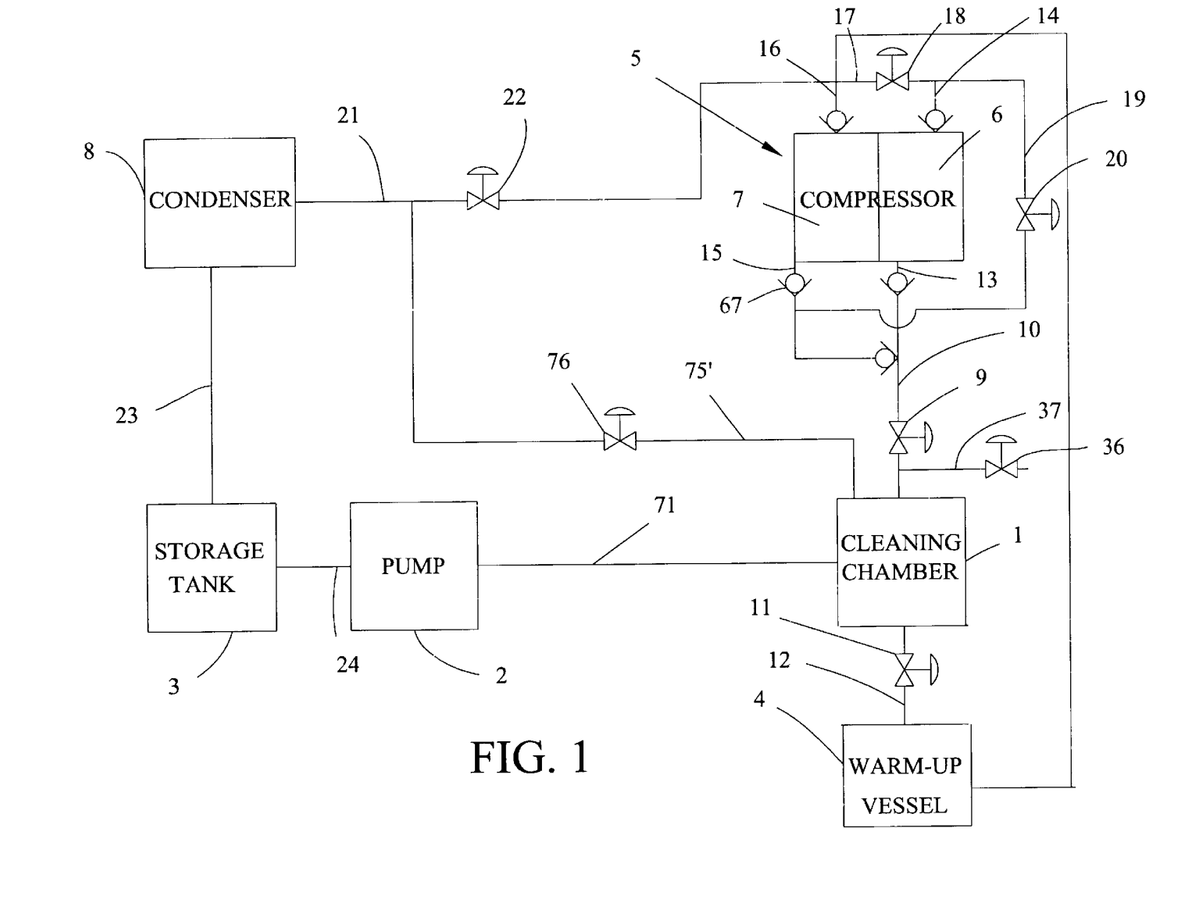
FIG. 1 is a schematic illustrating just the essential equipment elements in the apparatus for cleaning clothes, garments or fabrics including the compressor, cleaning chamber, warm-up vessel, pump, condenser and storage tank and their interconnection and valving.

FIG. 1 is a schematic illustrating just the essential equipment elements in the apparatus including the compressor 5, cleaning chamber 1, warm-up vessel 4, pump 2, condenser 8, and storage tank 3, and the interconnection and valving for cleaning clothes, garments or fabrics. The pump 2 is a positive displacement pump and is capable of outputting a variable amount of liquid carbon dioxide. The pump 2 is rated for 50 gallons per minute of liquid carbon dioxide at system pressure which is nominally 690 to 775 psig. All of the elements of the apparatus are controlled by a programmable logic controller 61. See FIG. 3A. The programmable logic controller used in the instant invention is a KOYO DL 405.

The hydraulic two stage compressor 5 employed in the invention includes a first stage 6 and a second stage 7. Reference numeral 13 indicates the first stage input of the compressor and reference numeral 14 indicates the first stage output of the compressor. Reference numeral 15 indicates the second stage input of the compressor and reference numeral 16 indicates the second stage output of the compressor. Reference numeral 67 indicates a check valve as will be readily understood by those skilled in the art for controlling the direction of the flow of gaseous carbon dioxide through the compressor. First valve 9 controls the flow in the first line 10 communicating between the cleaning chamber 1 and the compressor 9. Second valve 11 controls the flow in a second line 12 communicating between the warm-up vessel 4 and the cleaning chamber 1.

Third valve 18 controls the flow in third line 17 interconnecting between the first stage output 14 and the second stage output 16 of the compressor. Fourth valve 20 controls the flow in the fourth line 19 interconnecting the first stage output of the compressor to the second input of the compressor.

Fifth valve 22 controls the flow in fifth line 21 interconnecting the compressor 5 with the condenser 8. Sixth line 23 interconnects the condenser with the storage tank 3 and seventh line 24 interconnects the storage tank and the pump. A vent valve 36 and vent line 37 provide for venting of the cleaning chamber.

The equipment schematically illustrated in FIG. 1 is sufficient to perform a washing cycle. Line 75' and valve 76 permit a simple washing cycle flow path, namely, between the storage tank, pump, cleaning chamber, condenser and return to the storage tank.

Figure 2:
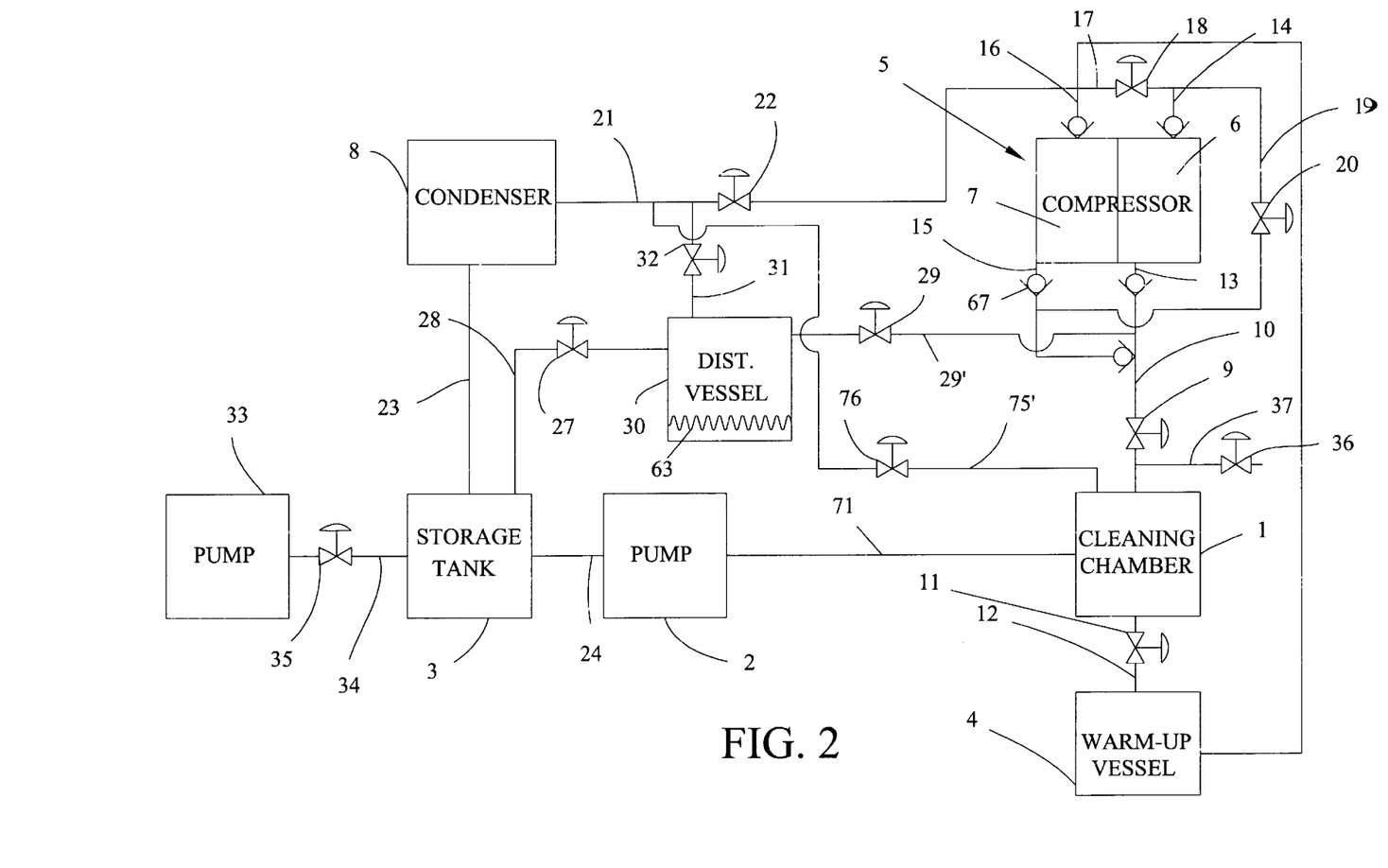
FIG. 2 is a schematic illustrating the essential elements in the apparatus for cleaning clothes, garments or fabrics together with a second pump for making up (adding) liquid carbon dioxide to the apparatus and equipment for distilling cleaning agents and dirt from the liquid carbon dioxide.

FIG. 2 is a schematic illustrating the essential elements in apparatus for cleaning clothes, garments or fabrics together with a second pump for making up (adding) liquid carbon dioxide to the apparatus and also includes equipment for distilling cleaning agents, and dirt from the liquid carbon dioxide.

FIG. 2 illustrates an air drive liquid carbon dioxide pump 33, sometimes referred to as second pump 33, for filling or making up liquid carbon dioxide to the storage tank 3 The second pump 33 is interconnected to the storage tank by line 34. Valve 35 permits or controls the admission of the liquid carbon dioxide into the storage tank. FIG. 2 additionally illustrates valve 27 controlling flow in line 28 interconnecting the storage tank and the distillation vessel 30. Distillation vessel 30 includes heater 63 whose function will be described in detail hereinbelow.

Still referring to FIG. 2, valve 76 controls flow in line 75' which interconnects the cleaning chamber and the condenser. Valve 32 resides in line 31 and controls flow between the distillation vessel and line which leads to condenser 8 Finally, still referring to FIG. 2, valve 29 controls the flow in line 29' interconnecting the distillation vessel and the compressor.

Figure 3:
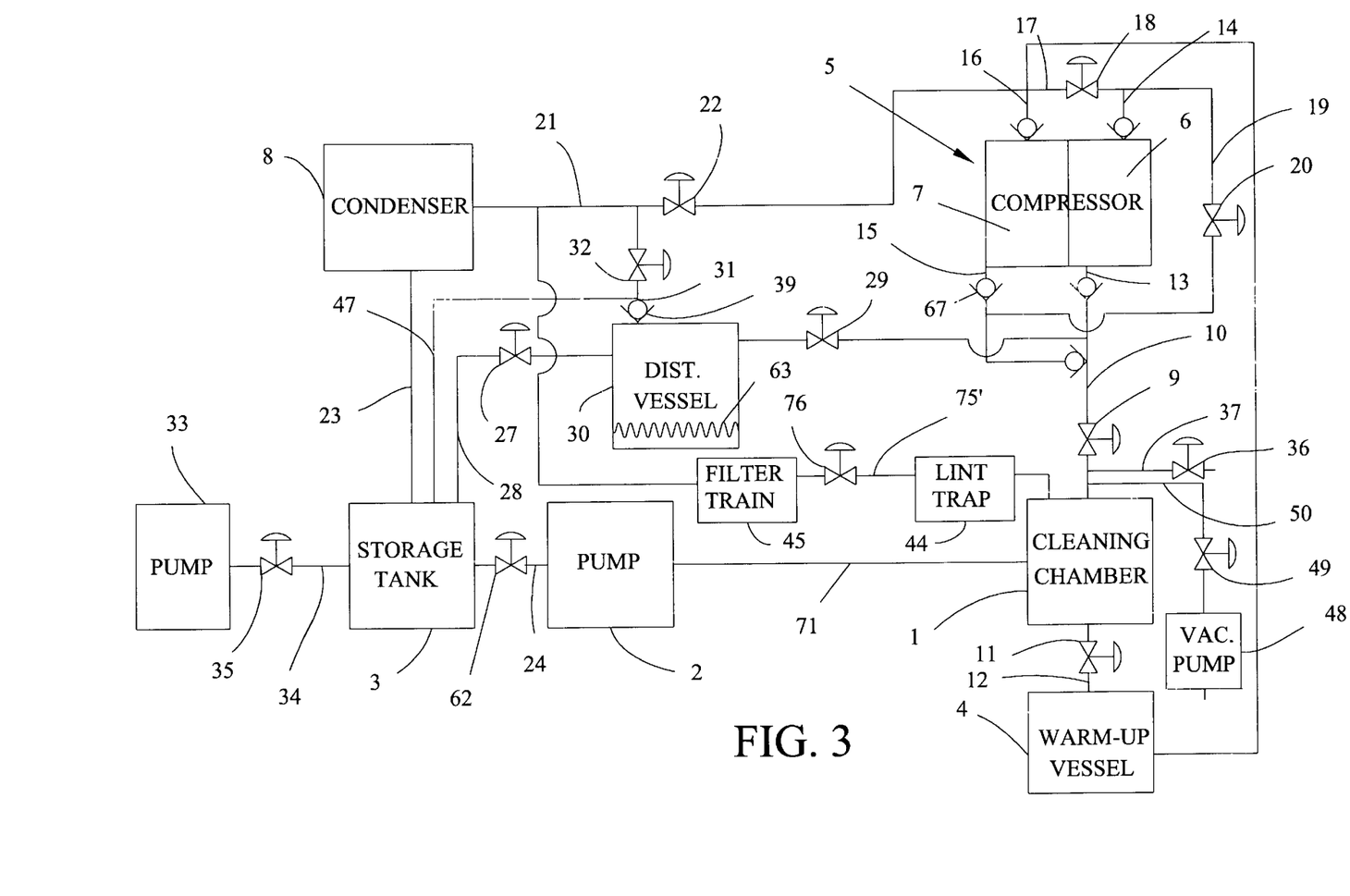
FIG. 3 is a schematic similar to FIG. 2 additionally illustrating a lint trap, filter train, vacuum pump for evacuating the cleaning chamber and a line and valve interconnecting the storage tank and the top (gas side) of the distillation vessel.

FIG. 3 is a schematic similar to FIG. 2 further illustrating a lint trap 44 and a filter train 45. Line 47 interconnecting the top of the storage tank to the top of the distillation vessel is also illustrated. Additionally, FIG. 3 illustrates a valve 49 controlling the flow in line 50 interconnecting the cleaning chamber 1 and the vacuum pump 48. FIG. 3 also illustrates valve 62 controlling flow in line 24 between the storage tank 3 and the pump 2. Line 75 interconnects the filter train and the condenser.

Figure 3A:
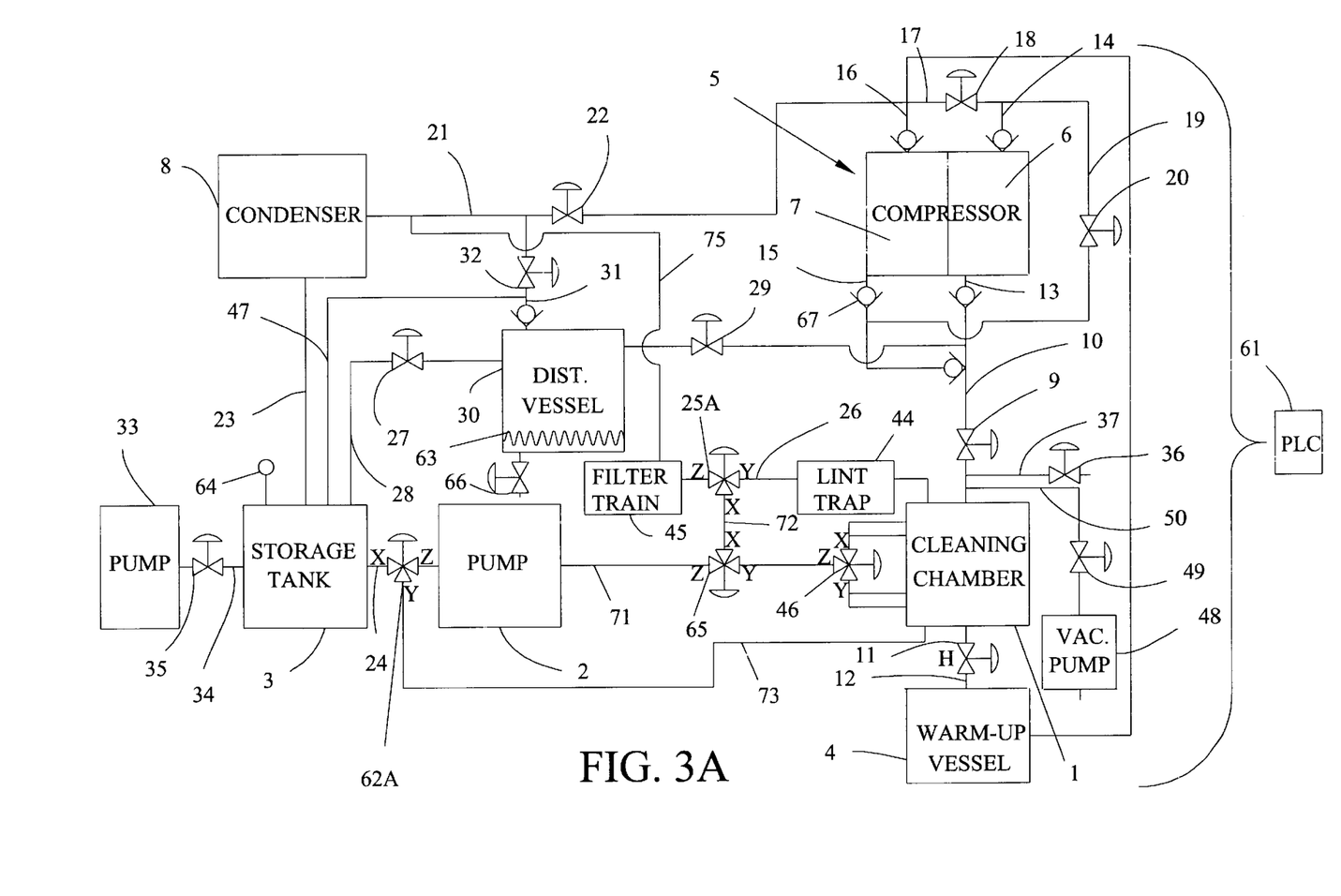
FIG. 3A is a schematic of the preferred embodiment of the invention.
Figure 5:
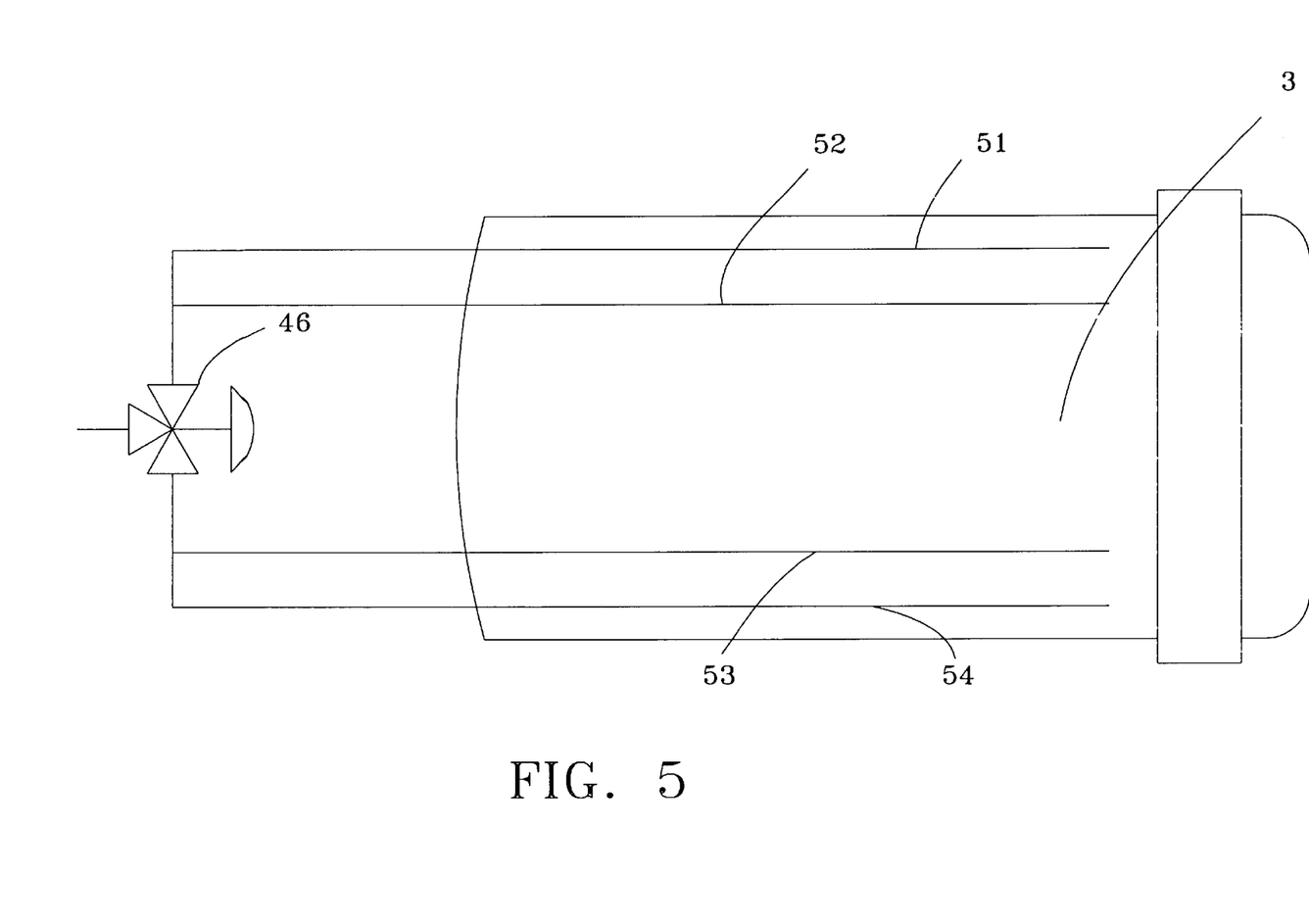
FIG. 5 is a schematic diagram of block 1, the cleaning chamber 1, illustrating a three-way valve for alternately directing the flow of liquid carbon dioxide into two sets of nozzles in the cleaning chamber.

FIG. 3A illustrates the preferred embodiment. FIG. 3A illustrates valve 62A, a three-way valve, which is capable of allowing flow through any two paths at one point in time but not through all three paths at the same time. The paths are labeled x, y and z on FIG. 3A. Also see FIG. 8 which is a tabulation of the valve positions versus the functional mode of the preferred embodiment of the apparatus as illustrated in FIG. 3A. Similarly, FIG. 3A illustrates valve 65 as a three-way valve interposed in line 71 between pump 2 and valve 46. Valve 46 is also a three-way valve and functions under the direction of the programmable logic controller and intermediate hardware to alternately send liquid carbon dioxide through one set of nozzles 51, 52 and then the second set of nozzles 53, 54. Also, see FIG. 5.

A check valve 39 in line 31 is interposed between line 47 and the distillation vessel.

Valve 65 is a three-way valve and its paths are labeled x, y and z. See FIG. 8 for a table of the positioning of valve 65 versus the functional modes of the apparatus.

Figure 8:
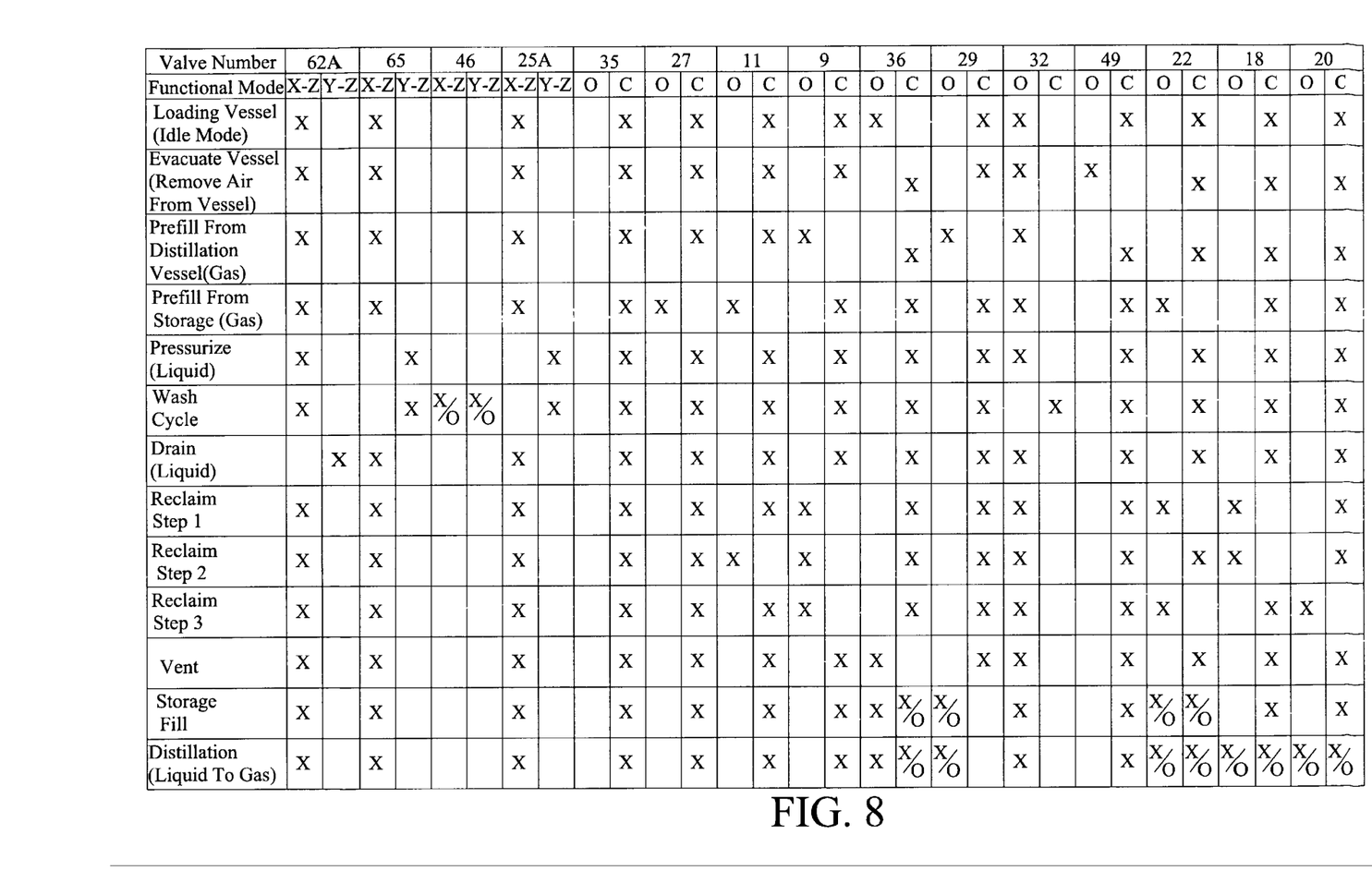
FIG. 8 is a table illustrating the valve positions corresponding to the functional modes of the preferred embodiment of the apparatus as illustrated in FIG. 3A.

Referring still to FIG. 3A, line 72 interconnects three-way valve 65 and three-way valve 25A. Three-way valve 25A and line 26 interconnect the filter train 45 and the lint trap 44. The valve position versus functional mode of valve 25A are shown in FIG. 8.

FIG. 3A also illustrates line 73 interconnecting the cleaning chamber 1 and the valve 62A. FIG. 3A also illustrates the distillation vessel 30 having a distillation dump valve 66. The distillation dump valve is operated when an accumulation of dirt and other solids accumulate on the bottom of the distillation vessel over a period of time. The distillation vessel functions to clean the liquid carbon dioxide by boiling off the clean liquid carbon dioxide and leaving behind the dirt and spent cleaning agents.

The present invention includes a reclamation process or mode. See FIGS. 8 and 3A. During reclamation, gaseous carbon dioxide resides in the cleaning chamber 1 and the clothes/fabrics therein. To improve efficiency and to remove the gaseous carbon dioxide from the clothes/fabric, the carbon dioxide must be evacuated from the cleaning chamber 1 Referring to FIG. 3A, carbon dioxide gas is removed through first valve 9 by the carbon dioxide compressor 5.

In this first step of reclaiming carbon dioxide gas from the cleaning chamber, the compressor 5 is used as a dual single stage compressor. In other words the compressor has two stages operating in parallel. After compression, the carbon dioxide gas is forwarded to the carbon dioxide condenser 8 via line 21 and valve 22 (which is open) where it is returned to the storage tank 3 as a liquid.

When the cleaning chamber pressure drops to approximately 450 psig, the second step of reclaiming gaseous carbon dioxide begins and the compressor pumps the gaseous carbon dioxide gas from the cleaning chamber through the warm-up vessel 4 and returns it to the cleaning chamber.

Valve 22 closes to force the compressed gas into warm-up vessel 4 and through valve 11 which opens to admit heated and compressed carbon dioxide gas into the cleaning chamber. This keeps the gas in the cleaning chamber 1 in the gaseous state and prevents formation of dry ice (solid carbon dioxide) in the clothes/fabrics. Those skilled in the art will recognize that other pressures may be utilized to initiate the second step of the reclamation process or mode.

A third reclamation step follows the warm-up step which is similar to the first reclamation stage. The compressor operates in the parallel mode, to wit, as a dual single stage compressor until such time as the pressure drops below 125 psig. When the cleaning chamber pressure drops below 125 psig the compressor is used as a two stage compressor operating in series. Valves 18 and 11 close and valve 20 opens allowing a first stage of compression and subsequently a second stage of compression. Valve 22 opens to allow the gas to pass to the condenser. Following the reclamation process or stages, the cleaning chamber is vented through line 37 and vent valve 36. This is known as the vent mode or evacuation mode.

Next, upon completion of the venting process, the cleaning chamber is opened to load/unload clothes and fabrics. The cleaning chamber has an inside length of 26 inches and an inside diameter of 26 inches. Upon closing the door to the cleaning chamber, the cleaning chamber is then evacuated through vacuum line 50 and valve 49 by means of a vacuum pump 49 as shown in FIG. 3A. Refer to FIG. 8 for the valve lineup for the evacuation mode of the preferred embodiment illustrated in FIG. 3A. This removes the air and/or water from the cleaning chamber.

The next mode is the prefill mode. Carbon dioxide gas is prefilled from the distillation vessel 30 through valves 9 and 29. Carbon dioxide gas is brought to the cleaning chamber from the distillation vessel and when the differential pressure between the cleaning chamber and the distillation vessel is less than or equal to 200 psi, then valves 9 and 29 are closed and prefilling gas from the top of the storage tank 3 begins.

The prefilling from the top of the storage tank 3 occurs through valves 32, 22 and 11. At this time, valve 27 is open to allow the distillation vessel to boil off some of the carbon dioxide which results in pressurizing the storage tank 3 so as to provide needed net positive suction head to the pump 2 Filling the cleaning chamber with carbon dioxide gas from the distillation vessel 30 and the storage tank 3 prevents the blockage of the flow nozzles with dry ice that would occur if filling liquid carbon dioxide directly from the storage tank to the cleaning chamber were attempted. When the storage tank/cleaning chamber differential pressure is less than 100 psi, the carbon dioxide gas is no longer brought from the top of the storage tank.

Once the cleaning chamber is filled with carbon dioxide gas as aforestated, the next mode is the pressurization mode. Valve 27 is closed. The cleaning chamber is initially filled from the storage tank by gravity and in pump 2 After some time the pump 2 is energized and finishes the filling of the cleaning chamber.

Liquid enters the cleaning chamber through valve 62A via ports x–z, valve 65 via ports z–y, and valve 46 through one of its paths. Pump 2 starts after a short time delay following the positioning of valve 65 to allow flow through ports z–y. The carbon dioxide gas is removed from the cleaning chamber through the lint trap, valve 25A via ports y–z, through the filter train, through line 75 and ultimately passes through the condenser where it is liquified and sent to the storage tank.

The wash cycle or mode is next. During the wash cycle the cleaning chamber is completely filled, with liquid carbon dioxide. Valve 46 is a three-way valve having one input and selectively outputs from one of two outputs. Valve 46 alternately permits fluid to flow to a first set of nozzles (51, 52) and a second set of nozzles (53, 54). This provides the agitation to the cleaning chamber so as to agitate the clothes/fabrics therein and to dislodge dirt from the clothes/fabrics. The wash cycle time is controlled and set by the operator as desired on the programmable logic controller. During the wash cycle liquid carbon dioxide is continuously pumped into the cleaning chamber and continuously removed from the cleaning chamber through the lint trap 44, through valve 25A via ports y–z, through the filter train 45, through line 75 and into the carbon dioxide condenser 8 where it is subcooled. The pressure in the storage tank is continuously monitored by a pressure transmitter 64 which transmits the pressure to a pressure indicating controller in the programmable logic controller, which provides on-off control for operation of a freon pump which controls the cooling circulation within the carbon dioxide condensing unit. The pressure set point, or the point about which control is maintained in the storage tank, is approximately 775 psig.

At the conclusion of the washing cycle or mode, the drain mode is entered. See, FIG. 3A and FIG. 8. Liquid is drained from the cleaning chamber through valve 62A via ports y–z to and through pump 2, through valve 65 via ports z–x, through valve 25A via ports x–z, through the filter train 45, through the carbon dioxide condenser 8 and ultimately to the storage tank 3.

During the drain mode pump 2 is not running. Upon conclusion of the drain mode (which is controlled by a drain timer) the first step of the reclaim mode is initiated.

Maintenance modes are indicated in FIG. 8 such as the mode for storage fill which is the carbon dioxide makeup mode. Similarly a valve lineup for the distillation of contaminants in the distillation mode is indicated in FIG. 8.

Referring to FIG. 3, the distillation mode, the electric heater 63 is energized provided the liquid carbon dioxide is above a low level setpoint. If the liquid carbon dioxide drops below the low level setpoint then the heater 63 is deenergized.

Above the low level setpoint, distillation vessel heater 63 is energized and boils the liquid carbon dioxide into gaseous carbon dioxide. The gaseous carbon dioxide is removed from the distillation vessel through valve 29 by the compressor 5. The distillation vessel pressure is reduced by the compressor 5 until it is 100 psi below the pressure of the storage tank. Valve 27 opens filling the distillation vessel with liquid carbon dioxide until the high level setpoint is reached. Valve 27 closes, compressor 5 shuts down, and vessel valve 29 closes when the liquid carbon dioxide reaches the high level setpoint. The distillation vessel heater remains powered when the liquid carbon dioxide is at or above the high level setpoint and boils off the liquid until it is below the high level setpoint which results in the opening of valve 29 and the starting of the compressor 5 The high and low setpoints are sensed by the heated thermocouple shown in FIGS. 4, 6 and 7.

Figure 6:
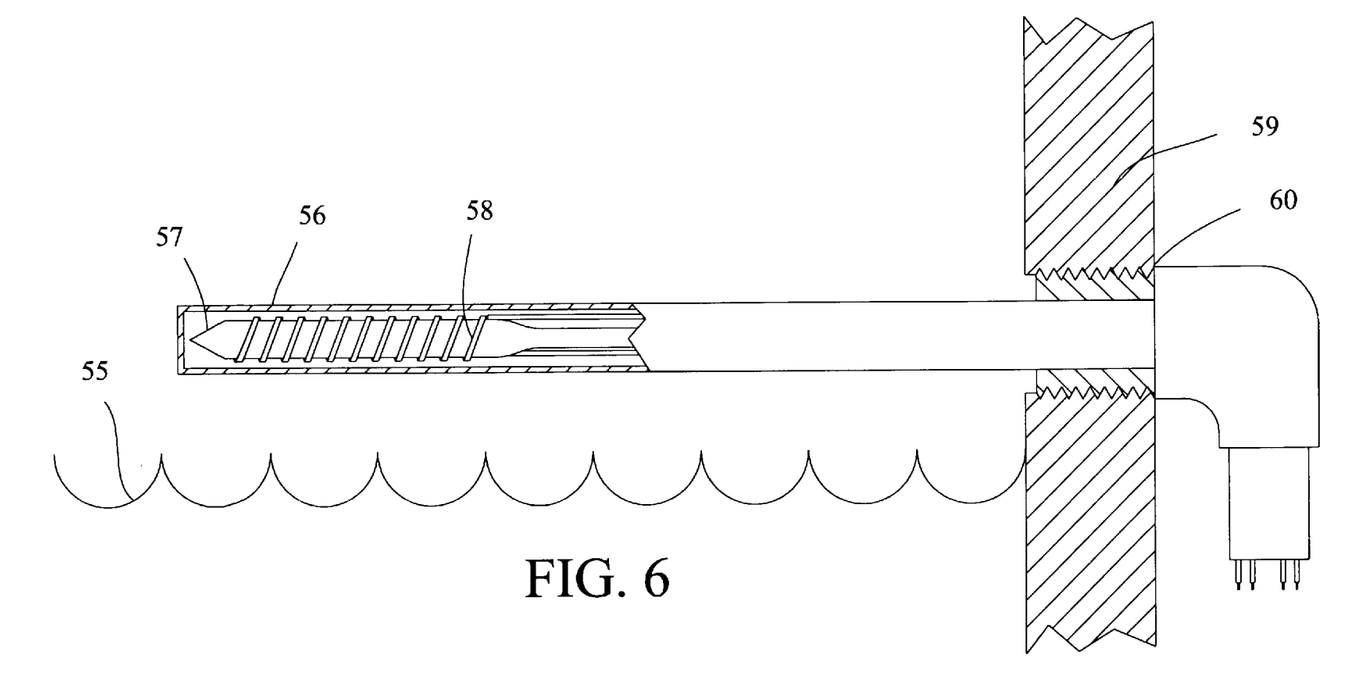
FIG. 6 is a cross-sectional view of the heated thermocouple in the tank with the liquid carbon dioxide level below the protective covering of the thermocouple.
Figure 7:
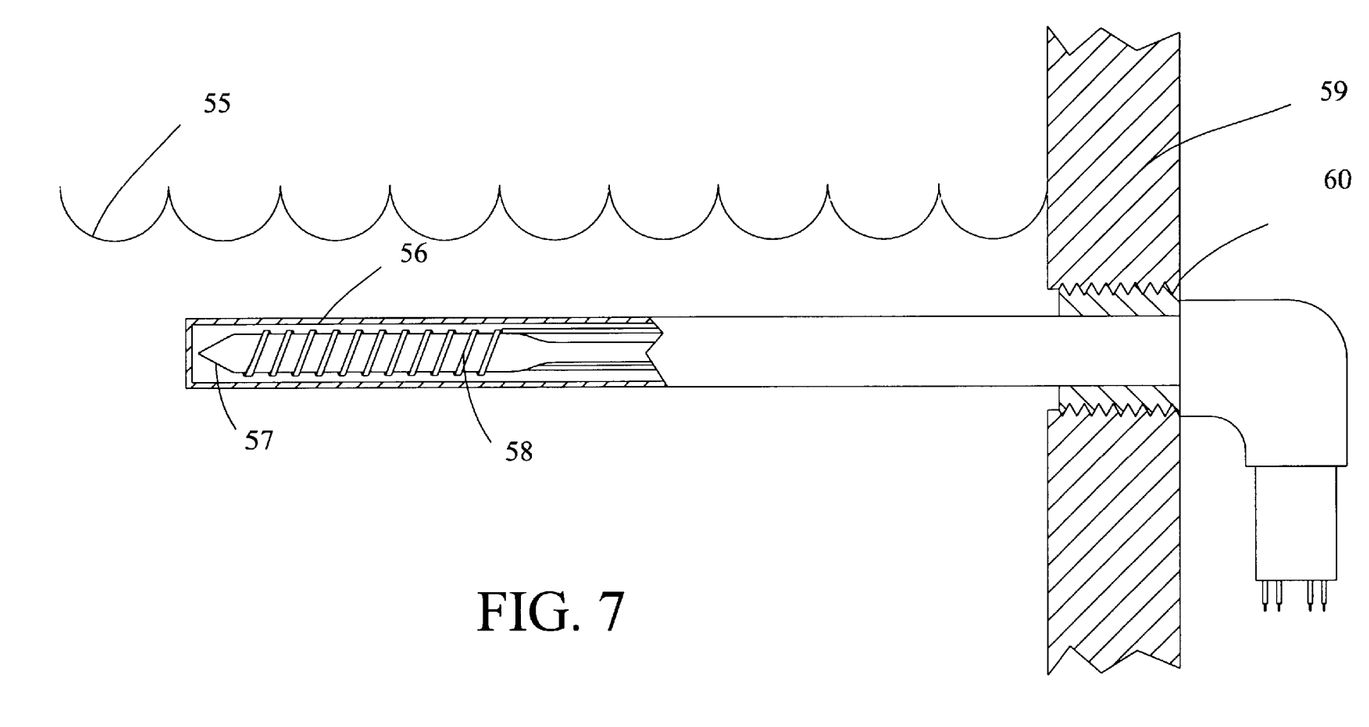
FIG. 7 is a cross-sectional view of the heated thermocouple in the tank with the liquid carbon dioxide level above the protective covering of the thermocouple.

In the storage tank fill mode, which is another maintenance mode, an air driven pump 33 supplies liquid carbon dioxide through valve 35 provided the liquid carbon dioxide is below the high level setpoint of the storage tank 3 There are four heated thermocouples as disclosed in FIGS. 4, 6 and 7 used to monitor and control the level of liquid carbon dioxide in the storage tank. Similarly, there are two heated thermocouples in the distillation vessel.

The programmable logic controller controls receives inputs from various pressure transmitters, position switches, pressure switches, limit switches, differential pressure switches, and temperature switches which are input into the programmable logic controller and are then manipulated by the programmable logic controller upon certain conditions being present. The programmable logic controller subsequently outputs certain signals for operation of relays, interposing relays and solenoids which control the apparatus and position the valves as shown in FIG. 8.

Figure 4:
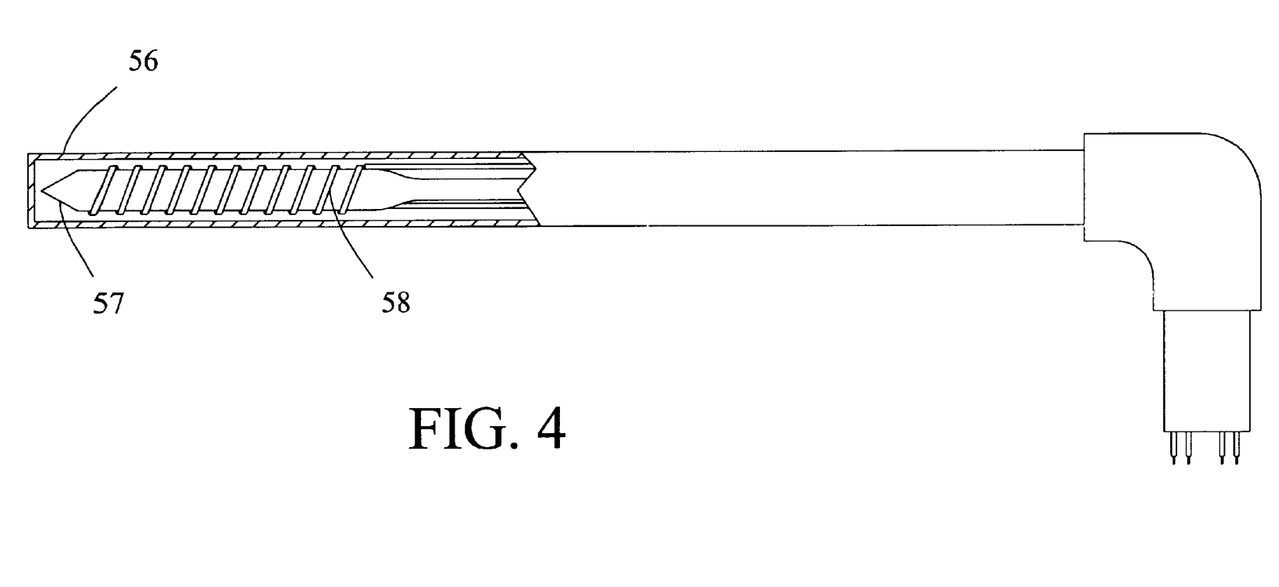
FIG. 4 is a partial cross-sectional view of the heated thermocouple used to detect, indicate, and control level of the liquid carbon dioxide in the storage tank.

It has been discovered that the use of a Type T thermocouple 57 with a heater 58 wrapped around the wires of the thermocouple as illustrated in FIG. 4 can be used to sense liquid level and, in particular, can sense the level of liquid carbon dioxide in a pressurized container. The Type T thermocouple is a copper-constantan combination and may or may not physically engage the protective covering 56 which is exposed to the liquid/gaseous carbon dioxide inside the storage tank. The protective covering is an incoloy sheath. Two watts are supplied at 24 volts D.C. to the heater. The signal wires are connected to a voltage measuring device which is input to the PLC.

When liquid carbon dioxide 55 covers the protective covering of the thermocouple a dramatic decrease in temperature is indicated. See, FIG. 7. When liquid carbon dioxide 55 is below the protective covering of the thermocouple a dramatic increase in temperature is indicated. See, FIG. 6. Therefore, carbon dioxide liquid level can be inferred from the measured temperature. Use of the thermocouple is an inexpensive, simple way of sensing the liquid level in a pressurized carbon dioxide storage tank 59. The thermocouple is affixed to the carbon dioxide storage tank by threaded connection or other means.

It will be apparent to those of skill in the art that the invention has been set forth by way of example only and that certain modifications can be made to the invention as described above without departing from the spirit and scope of the appended claims.

We claim:

1. An apparatus for cleaning clothes, garments or fabrics using liquid carbon dioxide comprising:
   a cleaning chamber for soaking and agitating said clothes, garments or fabrics in liquid carbon dioxide;
   a storage tank for storing liquid and gaseous carbon dioxide;
   a compressor;
   a condenser;
   a pump;
   and, a warm up vessel;
   a first valve residing in a first line communicating between said cleaning chamber and said compressor;
   a second valve residing in a second line communicating between said warm-up vessel and said cleaning chamber;
   said compressor having a first stage and a second stage;
   said first stage of the compressor having a first stage input and a first stage output and said second stage of the compressor having a second stage input and a second stage output;
   a third valve residing in a third line interconnecting said first output of said compressor and said second output of said compressor;
   a fourth valve residing in a fourth line interconnecting the first output of said compressor with the second stage input of the compressor;
   a fifth valve in a fifth line interconnecting the compressor with said condenser;
   a sixth line interconnecting the condenser with said storage tank; and,
   a pump residing in a seventh line interconnecting the storage tank and said cleaning chamber.

2. An apparatus as claimed in claim 1 further comprising a filter interconnected between said cleaning chamber and said condenser.

3. An apparatus as claimed in claim 2 further comprising a lint trap interconnected between said cleaning chamber and said condenser.

4. An apparatus as claimed in claim 1 further comprising means for removing an additive from said liquid carbon dioxide.

5. An apparatus as claimed in claim 4 wherein said additive is an emulsifier.

6. An apparatus for reclaiming gaseous carbon dioxide from a cleaning chamber employing carbon dioxide to launder clothes, garments or fabrics comprising:
   a compressor;
   a condenser;
   a storage tank;
   said compressor compressing said gaseous carbon dioxide;
   said condenser condensing said compressed gaseous carbon dioxide; and,
   said storage tank storing said carbon dioxide.

7. An apparatus as claimed in claim 6 further including a warm-up vessel, said warm-up vessel in combination with said compressor recirculating said compressed gaseous carbon dioxide to said cleaning chamber.

8. An apparatus as claimed in claim 7 wherein said compressor is a two stage compressor.

9. An apparatus as claimed in claim 7 wherein said compressor is a dual single stage compressor.

10. A process for reclaiming gaseous carbon dioxide from a cleaning chamber employing carbon dioxide to launder clothes, garments or fabrics, utilizing a compressor, condenser and storage tank, comprising the steps of:
    compressing said gaseous carbon dioxide;
    condensing said gaseous carbon dioxide into liquid carbon dioxide; and, storing said liquid carbon dioxide in a storage tank.

11. A process for reclaiming gaseous carbon dioxide as claimed in claim 10 further utilizing a warm-up vessel and further comprising the steps of:
    recirculating a portion of said compressed carbon dioxide through said warm-up vessel and to said cleaning chamber whereby said carbon dioxide is heated preventing the formation of solid carbon dioxide on said clothes, garments and fabrics.

12. An apparatus for cleaning the liquid carbon dioxide used in laundering clothes, garments and fabrics comprising;
    a storage tank and a distillation vessel;
    a compressor and a condenser;
    said distillation vessel includes a heater for boiling said liquid carbon dioxide;
    said compressor removing and compressing gaseous carbon dioxide from said distillation vessel;
    said condenser condensing said compressed gaseous carbon dioxide into liquid carbon dioxide; and,
    said storage tank storing said liquid carbon dioxide.

13. An apparatus as claimed in claim 12 further comprising a valve controlling flow of liquid carbon dioxide to said distillation vessel.

14. An apparatus as claimed in claim 13 further comprising a valve controlling flow of gaseous carbon dioxide between said distillation vessel and said compressor.

15. An apparatus as claimed in claim 13 further comprising a valve controlling flow of compressed gaseous carbon dioxide between said compressor and said condenser.

16. An apparatus as claimed in claim 12 further comprising valve means for:

controlling flow of liquid carbon dioxide to said distillation vessel;

controlling flow of gaseous carbon dioxide between said distillation vessel and said compressor; and, controlling flow of compressed gaseous carbon dioxide between said compressor and said condenser.

17. A process for cleaning carbon dioxide used in a process employing a storage tank, a distillation vessel, a compressor, and a condenser to clean clothes, garments and fabrics comprising the steps of:

filling a distillation vessel with liquid carbon dioxide from a storage tank until a predetermined high level in said distillation vessel is reached;

heating and boiling said liquid carbon dioxide in said distillation vessel to generate gaseous carbon dioxide;

removing said gaseous carbon dioxide from said distillation vessel and compressing said gaseous carbon dioxide with said compressor;

condensing said gaseous carbon dioxide in said condenser into liquid carbon dioxide; and, returning said liquid carbon dioxide to said storage tank.

18. A process as claimed in claim 17 wherein said step of heating and boiling said liquid carbon dioxide in said distillation vessel to generate gaseous carbon dioxide lowers said liquid level in said distillation vessel until a predetermined low level in said distillation vessel is reached initiating said filling of said distillation vessel.

* * * * *

UNITED STATES PATENT AND TRADEMARK OFFICE
CERTIFICATE OF CORRECTION

PATENT NO. : 5,970,554
DATED : October 26, 1999
INVENTOR(S) : Stephen H. Shore, et. al.

It is certified that error appears in the above-indentified patent and that said Letters Patent is hereby corrected as shown below:

IN THE ABSTRACT:

Line 2, delete "drying", and insert -- dry --.
Line 11, after "chamber", insert -- and it --.
Line 12, delete "steps", and insert -- step --.

Col. 1, line 15, delete "percholoeythylene", and insert
-- perchloroethylene --.
Col. 1, line 51, after "dioxide.", insert -- . --.
Col. 2, line 51, after "interconnected", insert -- a --.
Col. 3, line 5, after "clothes", insert -- , --.
Col. 6, line 1, after "8", insert -- . --.
Col. 6, line 54, after "1", insert -- . --.
Col. 7, line 44, after "2", insert -- . --.
Col. 7, line 56, after "2", insert -- . --.
Col. 8, line 2, after "filled", delete -- , ".
Col. 8, line 57, after "5", insert -- . --.
Col. 8, line 63, after "3", insert -- . --.
Col. 9, line 1, after "controller", delete "controls".

Signed and Sealed this

First Day of May, 2001

Attest:

NICHOLAS P. GODICI

Attesting Officer    Acting Director of the United States Patent and Trademark Office